United States Patent [19]

Igoe

[11] 4,178,390
[45] Dec. 11, 1979

[54] COMPOSITIONS FOR STABILIZING SOFT SERVE AND HARD FROZEN YOGURT

[75] Inventor: Robert S. Igoe, San Diego, Calif.

[73] Assignee: Merck & Co., Inc., Rahway, N.J.

[21] Appl. No.: 860,342

[22] Filed: Dec. 14, 1977

[51] Int. Cl.² .......................... A23C 9/12; A23G 9/04
[52] U.S. Cl. .................................. 426/43; 426/583; 426/565; 426/654
[58] Field of Search ............... 426/565, 566, 567, 583, 426/654, 43, 42, 34

[56] References Cited

U.S. PATENT DOCUMENTS

| | | | |
|---|---|---|---|
| 2,493,324 | 1/1950 | Steiner et al. | 426/566 |
| 2,823,129 | 2/1958 | Steinitz | 426/654 |
| 3,236,658 | 2/1966 | Little | 426/567 |
| 3,914,441 | 10/1975 | Finney et al. | 426/565 |
| 3,917,875 | 11/1975 | Gardiner | 426/583 |
| 3,932,680 | 1/1976 | Egli et al. | 426/583 |
| 3,978,243 | 8/1976 | Pedersen | 426/583 |
| 4,066,794 | 1/1978 | Schur | 426/583 |

Primary Examiner—Jeanette M. Hunter
Attorney, Agent, or Firm—Gabriel Lopez; Julian S. Levitt; Hesna J. Pfeiffer

[57] ABSTRACT

This invention relates to a stabilizer for soft serve and hard frozen yogurt. The stabilizer blend which consists of propylene glycol alginate, sodium alginate, guar, carrageenan and an emulsifier.

8 Claims, No Drawings

COMPOSITIONS FOR STABILIZING SOFT SERVE AND HARD FROZEN YOGURT

BACKGROUND OF THE INVENTION

This invention relates to a novel composition of matter which acts as an improved stabilizer in the preparation of soft serve yogurt and hard frozen yogurt. In the preparation of soft serve and hard frozen products, it is desirous to have a final product that is not only stable, but is attractive in appearance as well as smooth and free from graininess.

Most prior art gums and blends have been found to react with the milk protein during the processing procedures resulting in yogurts with whey-off and coarse bodied, grainy yogurt. By the term, "whey-off" is meant the separation of fluid material from solid material.

The instant invention is directed to novel compositions of matter which act as a stabilizer for soft serve and hard frozen yogurt. The stabilizer is a combination of ingredients having the following composition.

Propylene glycol alginate—45–60%
Sodium alginate—15–35%
Guar—10–20%
Carrageenan—2–10%

The stabilizer composition can in turn be utilized in combination with an emulsifier and is referred to as a blend. The stabilizer blend, therefore, is a mixture of the stabilizer as described above with an emulsifier. The stabilizer may constitute a range of about 55–75% by weight of the stabilizer blend and the emulsifier may constitute about 45–25% by weight of the stabilizer blend. The amount of emulsifier may vary, however, depending on which particular one is chosen. The stabilizer and stabilizer blend components are mixed by conventional methods including dry blending techniques which are known to those skilled in this art.

The stabilizer and/or blend composition can be added to the milk before or after processing, i.e., pasteurization, homogenization or incubation.

The stabilizer can be utilized in the soft serve or hard frozen yogurt at a range of about 0.1–0.4% by weight. A preferred range for stabilizer would be about 0.2% by weight.

The stabilizer blend can be utilized in the soft serve or hard frozen yogurt at a range of about 0.15–0.60% by weight. A preferred range for stabilizer blend would be about 0.3% by weight.

The emulsifier which can be utilized in the practice of this invention is any that is known in the art and acceptable for use in foods for human consumption. Typical emulsifiers that may be utilized include monoglycerides, diglycerides, lecithin, polysorbate 80 and polysorbate 65. These emulsifiers may be used alone or in combination with each other. For example, the polysorbates may be utilized with the monoglycerides or diglycerides and the like.

The following examples are capable of wide variation and modification, and any minor departure or extension is considered as being within the skill of the artisan and as falling within the scope of this invention.

EXAMPLE 1

The following soft yogurt formulation is a typical utilization of the stabilizer blend. The formulation is based on 100% total ingredients by weight.

| Ingredient | Parts by Weight |
| --- | --- |
| 3.5% fat milk | 54.0 |
| Milk solids non-fat | 6.0 |
| Sugar | 11.0 |
| 36 Dextrose eqiv.-corn syrup solids | 8.0 |
| *Stabilizer blend | 0.27 |
| Flavor concentrate | 0.40 |
| Color | trace |
| Water | 20.33 |
| *is: | |
| Propylene glycol alginate | .096 |
| Sodium alginate | .046 |
| Guar | .028 |
| Carrageenan | .010 |
| Mono/diglyceride | .072 |
| Polysorbate 80 | .018 |

Under medium to high speed agitation, the stabilizer/blend and milk solids non-fat (MSNF) are added to the milk. The milk solution is pasteurized at 180°–185° F. for 30 minutes and then homogenized at 2000 pounds per square inch (psi).

After cooling the milk to 90° F., the yogurt culture is then added. The inoculated milk is incubated at 90° F. for 15 hours to obtain a yogurt of pH 4.0 which is then stirred to a smooth consistency.

With mild stirring of the yogurt, the sugar, flavor concentrate, color and water are added. The yogurt is then homogenized at zero pressure to reduce the viscosity. The yogurt is then cooled over cooling coils at 40° F. and then frozen on a Sweden Single Barrel Freezer. The product is drawn at 19°–20° F. from the freezer to obtain a desired 50% overrun.

A formulation is run repeating the above ingredients and amounts, except that the emulsifier is omitted. The product obtained is of the same texture, appearance and smoothness as the product in which the emulsifier is utilized.

EXAMPLES 2–6

The procedure utilized in preparing Examples 2 through 6 is the same as Example 1 except that the amounts of ingredients in the formulation are changed as indicated.

| Ingredient | Ex. 2 | Ex. 3 | Ex. 4 | Ex. 5 | Ex. 6 |
| --- | --- | --- | --- | --- | --- |
| 3.5% fat milk | 68.6 | 57.1 | 54.3 | 71.4 | 57.1 |
| Milk solids non-fat | 4.1 | 5.54 | 6.0 | 5.1 | 7.04 |
| Sugar | 11.0 | 6.0 | 11.0 | 10.0 | 6.6 |
| 36 Dextrose eqv.-corn syrup solds | 4.0 | 7.0 | 8.0 | 9.0 | 8.8 |
| Stabilizer/emulsifier* | .30/.15 | .23/.12 | .20/.10 | .13/.07 | .13/.07 |
| Flavor concentrate | 0.9 | 0.5 | 0.8 | 1.0 | — |
| Flavor puree | — | 14.0 | — | — | 20.26 |
| Color | trace | trace | trace | trace | trace |
| Water | 10.95 | 9.51 | 19.6 | 3.3 | — |
| *is: | | | | | |
| Propylene glycol alginate | .135 | .1175 | .106 | .078 | .078 |
| Sodium alginate | .105 | .0575 | .05 | .0247 | .0195 |
| Guar | .045 | .0391 | .032 | .0143 | .0208 |
| Carrageenan | .015 | .0161 | .012 | .011 | .0117 |
| Mono/diglyceride | .12 | .096 | .08 | .056 | .056 |
| Polysorbate 80 | .03 | .024 | .02 | .014 | .014 |

The products obtained in the above examples have a smooth, grain-free characteristic when prepared and obtained in the desired 50% overrun.

What is claimed is:

1. A stabilizer for use in soft serve or hard frozen yogurt which comprises by weight:
   Propylene glycol alginate—45–60%
   Sodium Alginate—15–35%
   Guar—10–20%
   Carrageenan—2–10%

2. The stabilizer of claim 1 which comprises by weight
   Propylene glycol alginate—about 53%
   Sodium alginate—about 25%
   Guar—about 16%
   Carrageenan—about 6%

3. A stabilizer blend which comprises by weight 55–75% of a stabilizer of claim 1 and 25–45% of an emulsifier.

4. A soft serve or hard frozen yogurt containing a 0.1–0.4% by weight of a stabilizer which comprises by weight:
   Propylene glycol alginate—45–60%
   Sodium alginate—15–35%
   Guar—10–20%
   Carrageenan—2–10%

5. A yogurt of claim 4 containing about 0.2% by weight of a stabilizer of claim 2.

6. A soft serve or hard frozen yogurt containing 0.15–0.60% by weight of a stabilizer blend which comprises by weight 25–45% of an emulsifier and 55–75% of a stabilizer of claim 1.

7. A yogurt of claim 6 containing about 0.3% by weight of a stabilizer blend which comprises by weight about 33% of an emulsifier and about 67% of a stabilizer which comprises by weight:
   Propylene glycol alginate—about 53%
   Sodium alginate—about 25%
   Guar—about 16%
   Carrageenan—about 6%

8. In a process for the preparation of a cultured soft serve or hard frozen yogurt which comprises the stabilization, pasteurization, homogenization and culturing of a milk solution, the improvement comprising the addition, prior to pasteurization and culturing, of 0.1 to 0.4% by weight of a stabilizer which comprises by weight:
   Propylene glycol alginate—45–60%
   Sodium alginate—15–35%
   Guar—10–20%
   Carrageenan—2–10%

* * * * *